Feb. 10, 1953 P. D. HUDGINS ET AL 2,627,839
WHEEL MASK
Filed Sept. 6, 1951
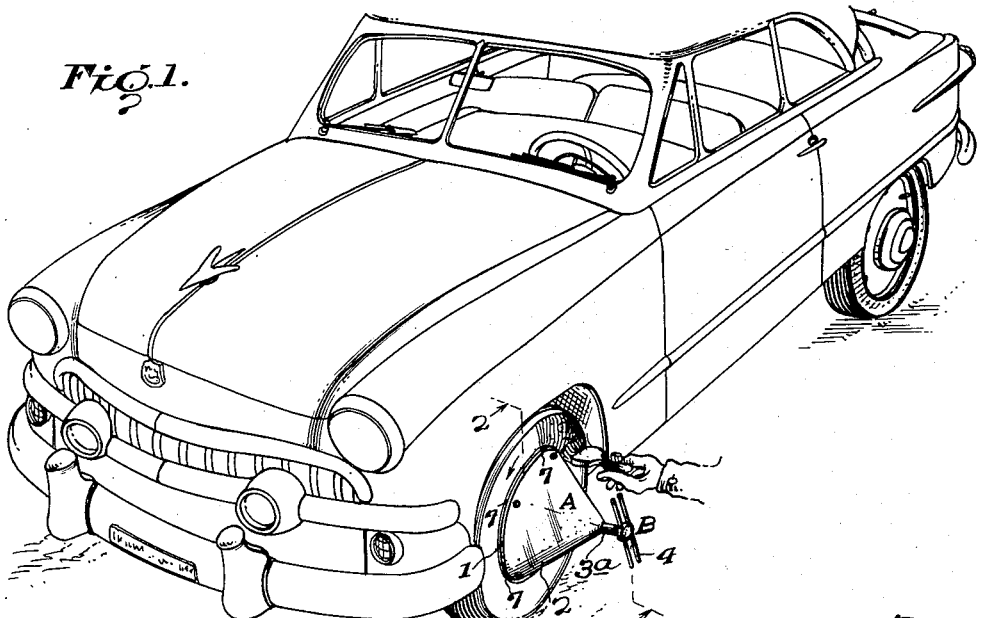
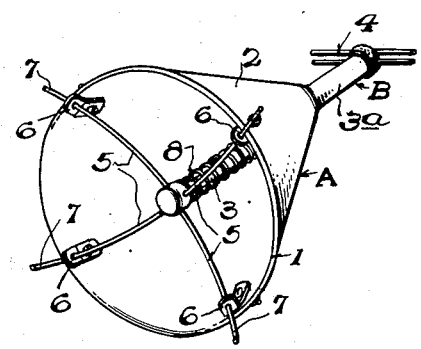
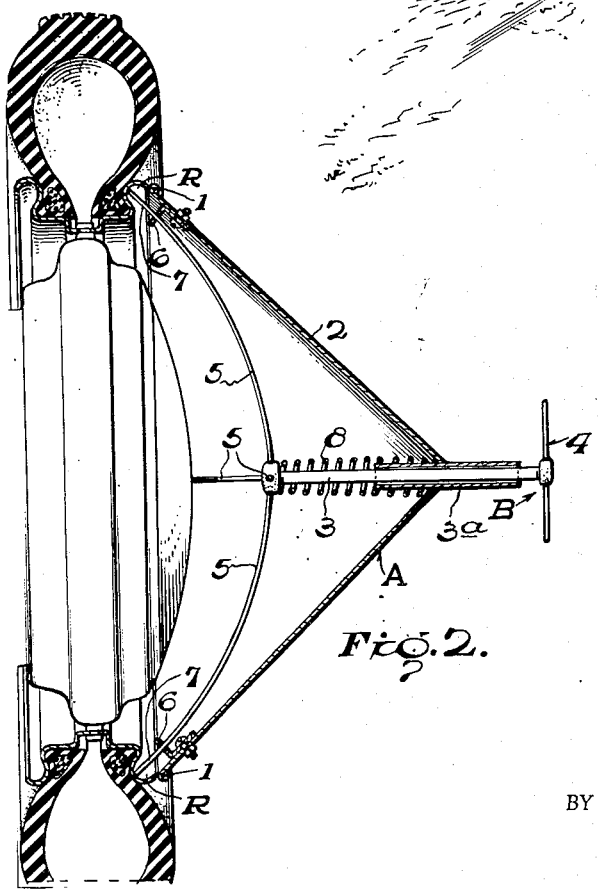
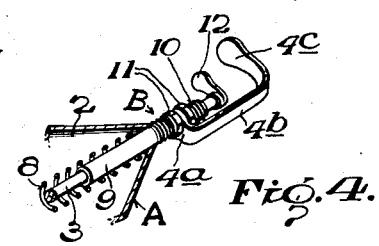
INVENTORS
Peter D. Hudgins
James P. Elliott.
BY
ATTORNEY Patented Feb. 10, 1953

2,627,839

UNITED STATES PATENT OFFICE 2,627,839

WHEEL MASK

Peter D. Hudgins and James P. Elliott,
South Boston, Va.

Application September 6, 1951, Serial No. 245,373

7 Claims. (Cl. 118—505)

1

This invention relates to a device for masking a vehicle wheel, more particularly the wheel of an automobile when it is desired to paint the tire with a dressing.

While fabric covers have been heretofore used for masking automobile wheel and tire assemblies during painting of a body, nevertheless, so far as we are aware no means have been provided for protecting the wheel and ornamental hubcap when it is desired to apply a white or black dressing to the sidewall of a tire, as, for example, when a car owner desires work of this kind at a service station. The type paint used on tires according to present practice frequently spatters or drips and makes it necessary to clean the wheel proper after the tire dressing operation. Not only is this cleaning of the wheel costly from the standpoint of time involved, but solvents used for such cleaning frequently harm the finish of the wheel or hubcap and, moreover, it is difficult to remove the dissolved residue of dressing from cracks and crevices necessarily existing in the wheel assembly.

Accordingly, the present invention has primarily in view of the provision of a device which is readily and quickly attachable and detachable from the rim portion of the wheel, whether or not the rim is equipped with tire balancing weights and, when applied to the wheel will adequately cover all ornamental surfaces which it is desired to keep clean while the car dressing operation is in progress, after the car has been washed.

Another object of the invention is to provide a device which is adjustable to different size conventional wheels and which is in the nature of a disc or conical mask having attaching means which may be readily manipulated by an attendant or operator to quickly mount and remove the device from the wheel by simple hand actuation.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:

Figure 1 is a perspective view of an automobile showing the conical mask applied to a tire and wheel assembly.

Figure 2 is a vertical-longitudinal cross-sectional view illustrating the conical mask and its attaching means in greater detail as applied to the wheel as shown in Figure 1 on the line 2—2.

Figure 3 is a perspective view of the conical mask unit as shown in Figures 1 and 2.

Figure 4 is a detail perspective view with parts in section of a modified form.

2

Similar reference characters designate corresponding parts throughout the several figures of the drawings.

In its primary aspect, the present invention includes a mask designated generally as A and means for attaching the same to a wheel designated generally as B.

The mask A may be of metal, plastic or other material of appropriate durability and is in the general shape of a hood or canopy. In the example shown, the mask A is conveniently of substantially conical form. In any event, the shape or profile of the mask must be such that when the peripheral edge portion 1 is applied to the wheel rim R, the body portion 2 will clear the hubcap assembly.

According to Figures 1–3, the means for attaching the mask A to the wheel rim preferably includes in its organization a shaft or plunger 3 which passes through and is guided by a sleeve 3a, said shaft having at its outer end a handle 4. This handle not only constitutes means for carrying or transporting the device when in use, but also serves as a means for actuating the attaching means to the rim of the wheel. To that end, the inner end of the shaft or rod 3 has connected thereto a series of radially extending relatively stiff or strong spring wire locking members 5 whose free ends slidably pass through suitable eyes provided in the inturned portions of brackets 6 or their equivalent adjacent the peripheral edge 1 of the mask. These portions of the brackets are set back from the periphery 1 of the mask to clear balance weights. The outer extremities 7 of the members 5 constitute rim engaging means for supporting the mask A on the wheel when the device is used in the tire painting operation.

As shown, the spring characteristics of the attaching members 5 may be retarded or cushioned on the back stroke of the shaft by coil spring 8 mounted about the shaft 3 and sleeve 3a and confined between an inner surface of the mask A and the point of crossing of the attaching members 5 at the inner end of the shaft 3, better shown in Figure 2. The adjustability of the device is controlled by the distance the shaft 3 is pulled back in Figure 2, thus retracting the wires 5 to the desired point for the different sizes of conventional wheels.

From the foregoing it will be understood that the mask A having a peripheral diameter equal to the size of the rim of a wheel may be applied to the wheel rim by positioning the mask with the peripheral edge 1 against the rim with one hand while the handle 4 is manipulated with the other hand to withdraw the shaft 3 to in turn retract the spring attaching elements 5. When the mask is positioned to cover the wheel and hubcap assembly, then handle 4 is released so that under the influence of the resilient attaching members 5 and spring 8, terminal portions 7 of the members 5 will engage beneath the bead of the rim to hold the mask in place.

The tire may then be dressed as desired without danger of soiling the wheel. When a wheel has been dressed, the mask may be readily removed by pulling outwardly on the handle 4 with one hand while using the pressure of the other hand against the outer surface of the mask, whereupon the device may be readily applied to another wheel to repeat the dressing operation.

The modified construction shown in Figure 4 permits of manipulating and applying the mask A with the use of one hand only instead of two hands. In this arrangement, the sleeve 9, which is a counterpart of sleeve 3a in Figure 2, is externally threaded at 10 to receive the lock nuts 11 for rigidly clamping the angular portion 4a of a hand grip 4b which has an angularly disposed gripping portion 4c. The shaft 3 which controls the slidable spring attaching members 5 is provided with a handle 12. By gripping the fixed hand grip portion 4a and handle 12 with one hand and squeezing both together the shaft or rod 3 may be withdrawn to retract the terminal portions 7 of the attaching members to clear the bead of the rim and permit the peripheral edge of the mask to bear against the rim and the handle 12 and hand grip 4c may be released to permit the spring attaching members to be projected beneath the bead of the rim to hold the mask in place. To remove the mask, the hand grip 4a and handle 12 are again squeezed together.

In both forms of the invention the attaching members 5 are manually retracted and spring projected to apply and hold the mask to the rim.

In use the device saves much time and labor in the surfacing operation and assures the car owner of a neat and attractive job.

We claim:

1. A device for protecting a wheel assembly during a tire dressing operation, comprising, a hollow mask having a circular edge, a plurality of manually controlled resilient means slidably carried by and disposed on the inner side of the mask adjacent said edge for attaching the mask to and detaching the mask from the rim of a wheel, and a single member for simultaneously actuating said plurality of means.

2. A device for protecting a wheel assembly during a tire dressing operation, said wheel assembly having a circular rim, comprising, a hollow mask having a circular peripheral portion for engagement with the rim of the wheel and means for attaching the mask to the rim of the wheel including a plurality of radial retractable and projectable resilient attaching members slidably carried by and disposed on the inner side of the mask adjacent said portion, a shaft connected at its inner end with said members for simultaneously controlling their operation and guided medially in the mask, and a handle at the outer end of said shaft.

3. A device for protecting a wheel assembly during a tire dressing operation, comprising, a body having a circular edge portion for engagement with the rim of the wheel, a shaft guided in the body, a handle at the exposed end of the shaft, and a plurality of radially disposed wire spring elements connected to the inner end of said shaft, means for slidably guiding the terminal portions of said members adjacent to the circular edge of the mask, said members being retractable and projectable by longitudinal movement of the shaft by said handle.

4. A device for protecting a wheel assembly during a tire dressing operation, comprising, a mask including a body for obturating the wheel assembly and having a circular edge portion for engaging the rim thereof, means for attachment of said mask to the rim of the wheel assembly, said means including, a shaft slidable in the body of the mask, a handle at the exposed end of the shaft, a plurality of radial spring wire elements having their inner ends connected to the inner end of the shaft, apertured brackets carried at the inner circular edge of the mask and slidably receiving the terminal portions of said attaching members, and a coil spring on the shaft confined between the body and the point of connection of said attaching members therewith.

5. A device for protecting a wheel assembly during a tire dressing operation, comprising, a hollow mask, and means for attaching the mask to the rim of the wheel, said means including, a shaft, a plurality of radial spring attaching members connected to the inner end of the shaft and slidably guided at their outer ends in the mask, a sleeve for guiding the shaft, a handle on the outer end of the shaft, and a hand grip rigidly attached to the sleeve and having a portion spaced from and in registry with the handle, whereby, when the handle and hand grip are squeezed together, the shaft will move outwardly to retract said attaching members.

6. A hub mask for wheels having a flanged rim, comprising a hollow member having a circular edge adapted to abut the side of the wheel adjacent said rim, a plurality of resilient rods disposed within the hollow member and having their ends normally projecting beyond said edge, means within said hollow member for slidably supporting said rods, and means, including an operator on the exterior of the hollow member, for bowing said rods and retracting the ends thereof.

7. An article of manufacture comprising a hollow conical member, a plurality of resilient rods radially disposed within the member with their ends normally projecting beyond the base edge thereof, means for slidably supporting the outer ends of said rods, a shaft axially disposed through the apex of the conical member and slidably carried thereby, said shaft being attached to said rods, whereby when said shaft is moved in the direction opposite the base of the conical member, the rods become bowed under resilient tension, the ends thereof becoming forcibly retracted within the hollow member, and are returnable to the normal position upon release of the shaft.

PETER D. HUDGINS.
JAMES P. ELLIOTT.

REFERENCES CITED

The following references are of record in the file of this patent:

UNITED STATES PATENTS

| Number | Name | Date |
|---|---|---|
| 1,381,983 | Fox | June 21, 1921 |
| 1,481,363 | Hall | Jan. 22, 1924 |
| 1,692,920 | Baker | Nov. 27, 1928 |
| 1,697,200 | Morgana et al. | Jan. 1, 1929 |
| 1,976,360 | Neuman | Oct. 9, 1934 |
| 2,081,666 | Gunn | May 25, 1937 |
| 2,369,671 | Greenburg | Feb. 20, 1945 |